(12) United States Patent
Miyata

(10) Patent No.: US 7,198,287 B2
(45) Date of Patent: Apr. 3, 2007

(54) AIRBAG DEVICE AND MOTORCYCLE WITH THE AIRBAG DEVICE

(75) Inventor: Yasuhito Miyata, Shiga (JP)

(73) Assignee: Takata Corporation, Tokyo (JP)

( * ) Notice: Subject to any disclaimer, the term of this patent is extended or adjusted under 35 U.S.C. 154(b) by 196 days.

(21) Appl. No.: 10/800,263

(22) Filed: Mar. 12, 2004

(65) Prior Publication Data

US 2004/0207182 A1   Oct. 21, 2004

(30) Foreign Application Priority Data

Apr. 17, 2003   (JP) ............................. 2003-113014

(51) Int. Cl.
*B60R 21/16* (2006.01)
(52) U.S. Cl. .................................................. 280/730.1
(58) Field of Classification Search ............. 280/730.1, 280/728.1
See application file for complete search history.

(56) References Cited

U.S. PATENT DOCUMENTS

| | | | |
|---|---|---|---|
| 5,501,489 A * | 3/1996 | Folsom et al. ............ | 280/743.1 |
| 5,938,231 A | 8/1999 | Yamazaki | |
| 6,802,528 B2 * | 10/2004 | Short et al. ............... | 280/728.3 |
| 6,846,009 B2 | 1/2005 | Kuroe et al. | |

FOREIGN PATENT DOCUMENTS

| | | | |
|---|---|---|---|
| DE | 101 06 437 A1 | | 8/2002 |
| JP | 2000108974 | | 4/2000 |
| JP | 2002-137777 | | 5/2002 |
| JP | 2003327182 A | * | 11/2003 |
| JP | 2005153613 A | * | 6/2005 |

* cited by examiner

*Primary Examiner*—Faye M. Fleming
(74) *Attorney, Agent, or Firm*—Fitch, Even, Tabin & Flannery

(57) ABSTRACT

An airbag device is mounted to a motor-bicycle, which is a motorcycle, and includes an airbag which is deployed and inflated while protruding in a direction of a rider protection area that is situated in front of a rider when the motor-bicycle collides at a location that is situated in front of the motor-bicycle. Generally, the airbag device is mounted to a handle-bar of the motorcycle. In a preferred form, with a recessed portion of a retainer being fitted to a handlebar body portion, the airbag device is mounted and secured to the handlebar by a body mounting member.

14 Claims, 3 Drawing Sheets

AIRBAG DEVICE AND MOTORCYCLE WITH THE AIRBAG DEVICE

FIELD OF THE INVENTION

The present invention relates to a technology of constructing an airbag device mounted to a motorcycle.

BACKGROUND OF THE INVENTION

Hitherto, various technologies of protecting a rider by an airbag device mounted to a motorcycle have been known. For example, a technology used in a motor-bicycle for restraining a rider by deploying and inflating an airbag, accommodated in a case mounted to a vehicle frame, by inflation gas when the motor-bicycle collides at a location that is situated in front of the motor-bicycle is known (refer to, for example, Japanese Unexamined Patent Application Publication No. 2002-137777). In this technology, it is possible to provide a wide area of protection using the airbag. However, there is a strong demand for a technology which is effective in reliably restraining a rider by an airbag when an airbag device is mounted to a vehicle body having an open structure in all directions like the body of a motorcycle.

SUMMARY OF THE INVENTION

Accordingly, it is an object of the present invention to provide a technology of constructing an airbag which thoroughly protects a rider on a motorcycle in an accident, and technologies related thereto.

To this end, the inventions disclosed in the claims are provided, and may be applied to a structure of an airbag device mounted to various types of motorcycles. In the specification, the term "motorcycle" is used to widely include vehicles in which a rider sits astride a seat. Therefore, for example, a motor-bicycle of a type having a fuel tank disposed in front of a rider's seat and a motor-bicycle of a scooter-type having a space between a rider's seat and a handlebar supporting head tube are defined as motorcycles. In addition, the term "motorcycle" is used to widely include, in addition to motor-bicycles, vehicles having three or more wheels and having a seat that a rider sits astride (such as a three-wheeled motorcycle used to, for example, deliver pizzas to homes, and a three-wheeled or a four-wheeled buggy motorcycle for traveling bad roads completely), and vehicles, such as snowmobiles, which move using a sled or a crawler and which have a seat that a rider sits astride.

In one aspect of the invention disclosed hereinafter, an airbag device mounted to a motorcycle comprises an airbag. When the motorcycle collides at a location that is situated in front of the motorcycle, inflation gas is supplied into the airbag used in the present invention. In a typical structure of the airbag device, the airbag and means for inflating the airbag, such as an inflator, are accommodated in a retainer, serving as an accommodating member, and the inflation gas is supplied into the airbag by operating the inflator. By this, the airbag is deployed and inflated while protruding in the direction of a rider protection area disposed in front of a rider.

In particular, a distinctive feature of the airbag device of the present invention is that the airbag device comprises an engaging portion which can engage a handlebar section of a motorcycle. In other words, in the present invention, part of or the entire airbag device is engaged with and mounted to the handlebar section. In order to engage the airbag device with the handlebar section, for example, the airbag device is formed with a form that can engage the handlebar section, or the handlebar section is formed with a form that can engage the airbag device.

The term "handlebar section" in the present invention is used to include, not to mention handlebars themselves, various types of members, such as a bracket, mounted to the handlebars, and a structure which is a combination of such various types of members and the handlebars. The term "engage" is mainly used to widely include a mode in which a protruding portion is fitted to a recessed portion, and a mode in which a protruding portion is caught by a recessed portion. In a typical structure, a portion with a form that can engage the handlebar section is disposed at the accommodating member (retainer) for accommodating the airbag, and the accommodating member is engaged with and mounted to the handlebar section. According to such a structure, when the airbag device is to be mounted to the motorcycle, it is possible to use the handlebar section as a location for mounting the airbag device. This structure is an improved structure because the handlebar section can be effectively used for mounting the airbag device.

Here, specific examples of the "engaging portion" include a recessed portion to which a protruding portion of the handlebar section can be fitted, and a protruding portion which can be fitted to a recessed portion of the handlebar section. When a recessed portion is formed in the airbag device, for example, a groove-like or a hole-like recess is formed in the accommodating member (retainer) for accommodating the airbag, and the recessed portion is fitted to the handlebar section that is long. In contrast, when a recessed portion is to be formed in the handlebar section, for example, a long member, which is the handlebar section, is bent to form a recessed portion (recess space), and the accommodating member is fitted to the recessed portion. When, for example, the handlebar section comprises a hollow tube, a portion of the tube is formed with a recessed form in cross section, and the accommodating member is fitted to the recessed portion. Such structures make it possible to further enhance mountability of the airbag device to the handlebar section.

A motorcycle generally has a structure in which the handlebar section opposes a rider protection area that is situated in front of a rider. According to the present invention in which the airbag device is disposed at the handlebar section opposing the rider protection region in such a motorcycle structure, it is possible to stably and reliably protrude the airbag in the direction of the rider protection area. The structure in which the airbag device is mounted to the handlebar section makes it possible to enhance mountability of the airbag device because the mounting location of the airbag device is easily set.

By mounting the airbag device to the handlebar section by mounting means, such as types of rivets, bolts, or clips, it is possible to prevent the airbag device from being displaced when the airbag that is completely deployed and inflated restrains a rider. In addition, by causing the handlebar section that is rigid to operate as a pressure section of the airbag that is completely deployed and inflated, it is possible for the handlebar section to reliably receive a load that the rider exerts upon the airbag. In general, the handlebar section of the motorcycle may be disposed at a location where it easily hinders the deployment and inflation of the airbag. If the airbag device is mounted to the handlebar section itself, the frequency with which the handlebar section hinders the deployment and inflation of the airbag is reduced. Therefore, it is possible to thoroughly protect the rider in an accident.

It is desirable that the airbag device, typically the accommodating member (retainer) for accommodating the airbag, be formed with a size in correspondence with an area occupied by the handlebar section, so that it does not considerably protrude beyond this area. Such a structure makes it possible to prevent the airbag device from considerably protruding beyond the area occupied by the handlebar section. Accordingly, with the handlebar section being easily operable, it is possible to improve the appearance of an area near the handlebar section.

In the airbag device disclosed in one preferred form, the airbag is disposed in a longitudinal direction of the handlebar section which is long. Typically, the accommodating member (retainer) for accommodating the airbag is disposed in a longitudinal direction of the handlebar section. The long handlebar section is disposed in a wide range opposing (facing) the rider protection area. Therefore, by disposing the airbag over such a wide range in the longitudinal direction of the handlebar section, it is possible to increase directivity regarding protrusion of the airbag, so that this structure is effective in controlling a protruding direction of the airbag.

The invention disclosed in another form refers to a motorcycle having any one of the airbag devices described above mounted thereto. By this, a motorcycle which can thoroughly protect a rider in an accident by stably and reliably protruding the airbag in the direction of the rider protection area is provided.

DETAILED DESCRIPTION OF THE PREFERRED EMBODIMENTS

Figure 1:
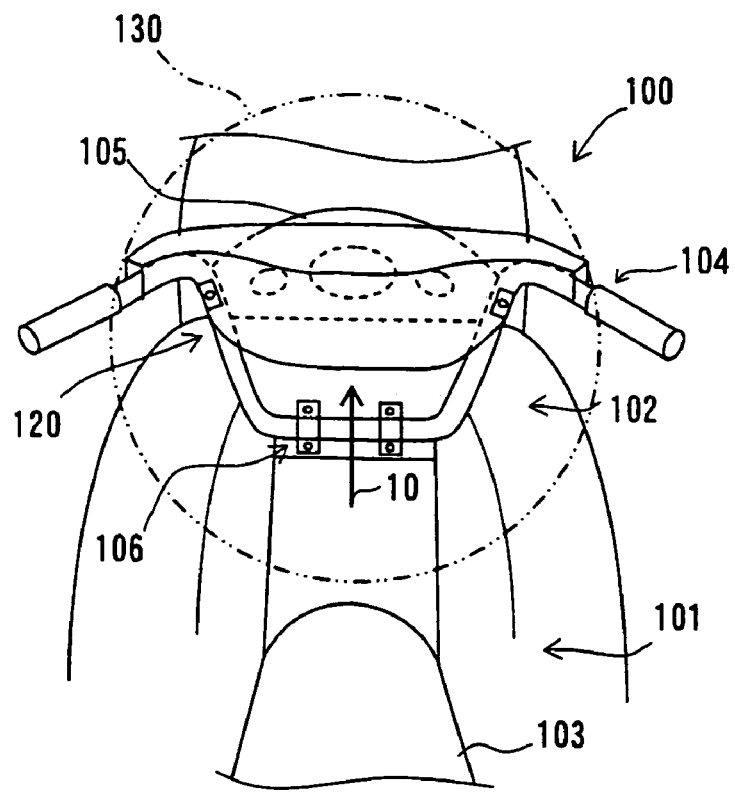
FIG. 1 shows a motor-bicycle 100 (scooter) of an embodiment of the present invention as seen from a rider, with an airbag device 120 being mounted to the motor-bicycle 100.
Figure 2:
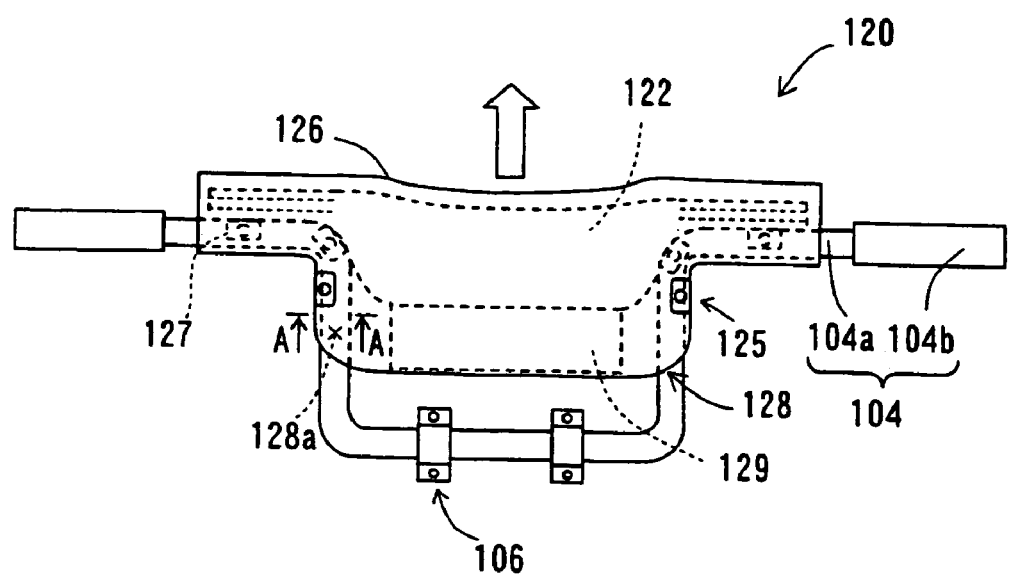
FIG. 2 illustrates the structure of the airbag device 120 shown in FIG. 1.
Figure 3:
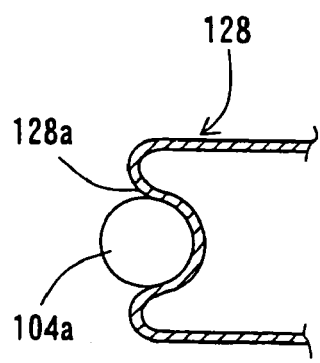
FIG. 3 is a sectional view taken along line A—A of FIG. 2 in the direction of arrows.
Figure 4:
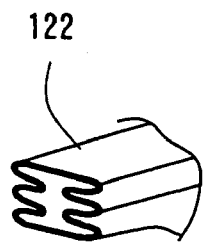
FIG. 4 is a partial enlarged view of FIG. 2.

Hereunder, a detailed description of an embodiment of the present invention will be given with reference to the drawings. FIG. 1 shows a motor-bicycle 100 (scooter) of an embodiment of the present invention as seen from a rider, with an airbag device 120 being mounted to the motor-bicycle 100. FIG. 2 illustrates the structure of the airbag device 120 shown in FIG. 1. FIG. 3 is a sectional view taken along line A—A of FIG. 2 in the direction of arrows. FIG. 4 is a partial enlarged view of FIG. 2. The motor-bicycle 100 of the embodiment is one example of a motorcycle in the present invention.

As shown in FIG. 1, the motor-bicycle 100 is a scooter almost exclusively comprising a vehicle-body structural portion 101, a seat 103, a handlebar 104, and a front wheel and a rear wheel (not shown). The vehicle-body structural portion 101 comprises, for example, an engine and a mainframe. The rider can sit astride the seat 103.

An area disposed above the vehicle-body structural portion 101 of the motor-bicycle 100 and in front of the rider is defined as a rider protection area 130 that is used to protect the rider when the motor-bicycle 100 collides at a location that is situated in front of the motor-bicycle 100. In the embodiment, the phrase "the motor-bicycle 100 collides at a location that is situated in front of the motor-bicycle 100" is used widely to include any collision of the motor-bicycle 100 with an object (not shown for the sake of simplicity) disposed in front of the motor-bicycle 100. In addition, in the embodiment, the term "rider protection area 130" is defined as a space which extends in a forward movement direction 10 of the rider and which is used to restrain and protect the rider that is in a state capable of being thrown off in the forward direction of the motor-bicycle 100 when kinetic energy that is generated when the motor-bicycle 100 collides at a location that is situated in front of the motor-bicycle 100 is acting to move the rider in the forward direction of the motor-bicycle 100.

The handlebar 104, the airbag device 120, and a panel 105 having various types of meters, switches, etc., disposed thereat are disposed at the front portion 102 of the vehicle body among the portions of the vehicle-body structural portion 101. The handlebar 104 corresponds to the "handlebar section" in the present invention, and comprises a handlebar body 104a and grips 104b mounted to respective ends of the handlebar body 104a. The handlebar body 104a is formed by bending a hollow member having the form of a tube into the form of a recess. In the embodiment, the handlebar body 104a corresponds to the "recessed portion" in the present invention. The handlebar 104 is mounted to the vehicle body by handlebar mounting members 106.

In particular, the airbag device 120 of the embodiment is mounted to the handlebar 104, and faces the rider protection area 130. In other words, the airbag device 120 of the embodiment is disposed so that a protruding (deployment and inflation) direction of an airbag 122 (described later) is in the forward direction of the rider.

As shown in FIG. 2, the airbag device 120 almost exclusively comprises, for example, the airbag 122, a retainer 128 for accommodating the airbag 122, an inflator 129 for supplying inflation gas for deploying and inflating the airbag 122 from the retainer 128, body mounting members 125, a cover 126, and airbag fixing members 127.

As shown in FIG. 3, the retainer 128 has a recessed portion 128a extending in the form of a groove towards both ends of the retainer 128. The recessed portion 128a can be fitted to (that is, can engage) a portion of the handlebar body 104a extending in a vertical direction. The retainer 128 corresponds to the "accommodating member" in the present invention, and the recessed portion 128a corresponds to the "engaging portion" in the present invention. With the recessed portion 128a being fitted to the handlebar body 104a, the retainer 128 is mounted and secured to the handlebar 104 by the body mounting members 125. By this, the entire airbag device 120 is mounted to the handlebar 104.

The cover 126 covers the top portion of the retainer 128, and allows the airbag 122 to protrude when the airbag 122 that is protruding (being deployed and inflated) is torn along a thin tear line (not shown).

In the retainer 128, the airbag 122 is, for example, as shown in FIG. 4, folded like an accordion and is mounted to the handlebar body 104a by the airbag fixing members 127.

For example, types of rivets, bolts, or clips may be used as required for the body mounting members 125, the airbag fixing members 127, and the handlebar mounting members 126.

Figure 5:
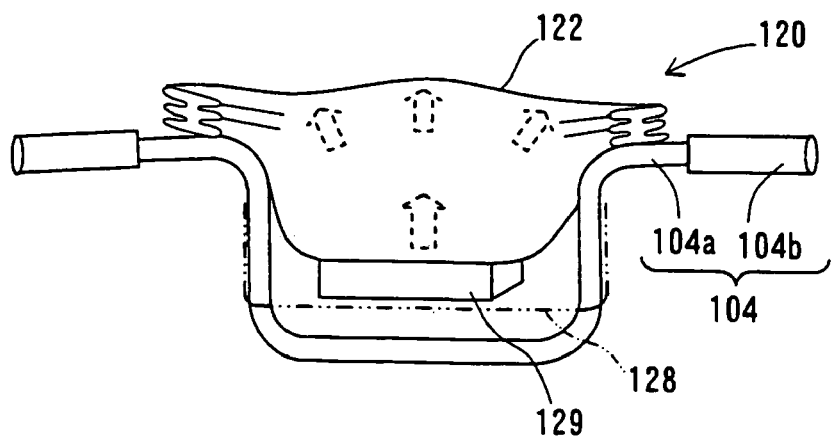
FIG. 5 is a schematic view showing an initial state of deployment of the airbag device 120.
Figure 6:
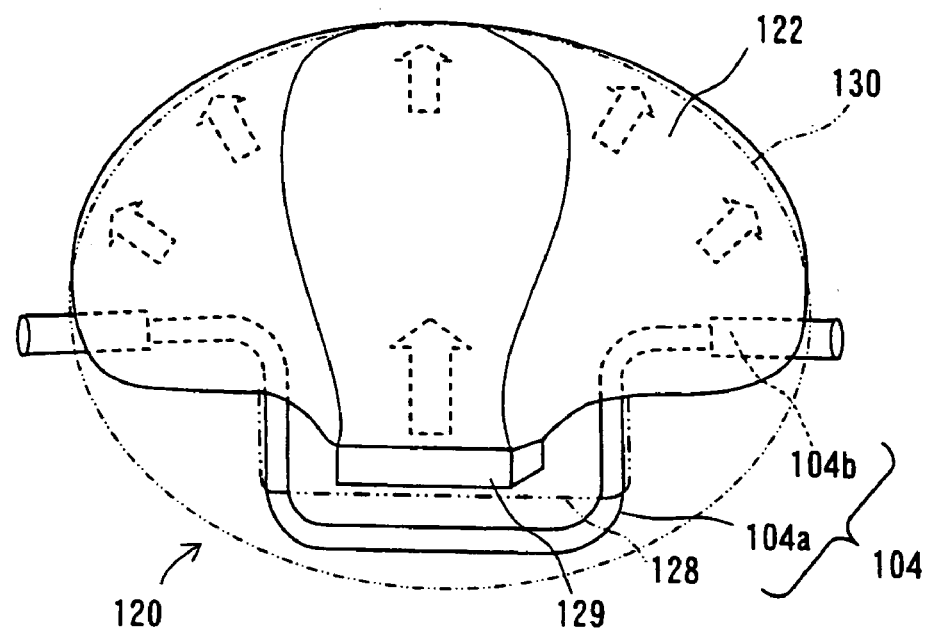
FIG. 6 is a schematic view showing a state in which the deployment of the airbag device 120 is completed.

Next, the operation of the airbag device 120 and the motor-bicycle 100 of the embodiments having the above-described structures will be described with reference to, for example, FIGS. 5 and 6 in addition to FIGS. 1 to 4. FIG. 5 is a schematic view showing an initial state of deployment of the airbag device 120. FIG. 6 is a schematic view showing a state in which the deployment of the airbag device 120 is completed.

When the motor-bicycle 100 that the rider is riding collides in a direction of travel in an accident, the rider is in a state capable of being moved (thrown off) in the forward direction (that is, the direction of arrow 10 in FIG. 1) of the motor-bicycle 100. In the embodiment, by detecting the collision of the motor-bicycle 100 at a location that is situated in front of the motor-bicycle 100, the airbag device 120 operates in order to start the protrusion (deployment) of the airbag 122 from the airbag device 120 in the direction of the rider protection area 130. In other words, the deployment and inflation of the airbag 122 are started by starting supply of inflation gas into the airbag 122 from the inflator 129 serving as inflation gas supplying means. The initial state of deployment of the airbag device 120 is shown in, for example, FIG. 5.

As shown in FIG. 5, in the initial state of deployment of the airbag device 120, the airbag 122 splits the cover 126 while forcibly coming out of the retainer 128, and is inflated while being deployed. A mode in which the airbag 122 is inflated while being deployed corresponds to "deployed and inflated" in the present invention.

The supply of the inflation gas into the airbag 122 is continued, so that, finally, the airbag device 120 is completely deployed. This state is shown in, for example, FIG. 6.

As shown in FIG. 6, when the airbag 122 is completely deployed and inflated, the inflated airbag 122 fills the rider protection area 130 in order to, at the rider protection area 130, reliably hold and restrain the rider that is in a state capable of being moved in the forward direction of the vehicle body (that is, the direction of arrow 10 in FIG. 1) by kinetic energy that is produced in a collision, thereby preventing beforehand the rider from being thrown off in the forward direction of the motor-bicycle 100.

As described above, according to the airbag device 120 of the embodiment, it is possible to effectively use the handlebar 104 for mounting the airbag device 120. In particular, since the recessed portion 128a of the retainer 128 is fitted to the handlebar body 104a, the form of the handlebar 104 itself can be made use of to dispose the airbag device 120, so that the mounting structure is improved.

By mounting the airbag device 120 of the embodiment to the handlebar 104, it is possible to reduce the frequency with which the deployment and inflation of the airbag 122 is hindered when the airbag 122 gets caught by a protruding portion of, for example, the handlebar 104. In general, the handlebar of the motorcycle may be disposed at a location where it easily hinders the deployment and inflation of the airbag. However, the embodiment in which the airbag device 120 is disposed at the handlebar 104 itself with each module is particularly effective in overcoming such a problem. Therefore, it is possible to thoroughly protect the rider in an accident.

The structure of the airbag device 120 of the embodiment makes it is possible to increase directivity regarding protrusion of the airbag 122, so that this structure is effective in controlling a protruding direction of the airbag. In other words, although it is necessary to think about, for example, how to fold the airbag so that it protrudes in a proper protruding direction in a related structure in which the entire airbag is accommodated in the accommodating member (retainer), it is possible to stably and reliably protrude the airbag 122 in the direction of the rider protection area 130 in the embodiment. It is more effective to, in particular, dispose the airbag 122 over a wide range in a longitudinal direction of the long handlebar 104.

In the embodiment, since the airbag 122 is secured to the handlebar 104 by the airbag fixing members 127, the airbag 122 that is completely deployed and inflated does not easily get shifted when it is restraining the rider. In addition, since the handlebar 104 that is rigid operates as a pressure section of the airbag 122, a load that the rider exerts upon the airbag 122 can be reliably received by the handlebar 104.

The present invention is not limited to the above-described embodiments, so that various other applications and modifications are possible. For example, the following forms to which any of the first to third embodiments are applied are possible.

Figure 7:
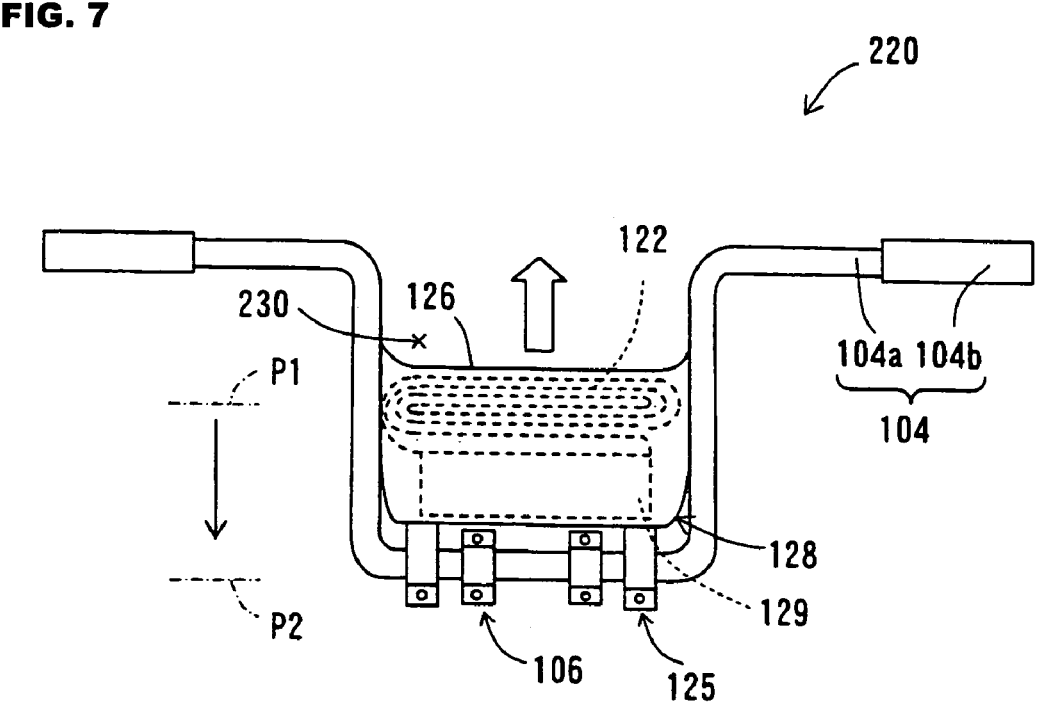
FIG. 7 shows the structure of an airbag device 220 of another embodiment of the present invention.

Instead of the airbag device 120 of the embodiment, an airbag device 220 having the structure shown in FIG. 7 may be used. Parts shown in FIG. 7 that correspond to those shown in FIG. 2 are given the same reference numerals, and will not be described in detail below.

In the embodiment shown in FIG. 7, the location where the handlebar body 104a is secured to the vehicle body is lower than in the first embodiment. Due to this, a recess space 230 is formed. The entire airbag device 220 is disposed in the recess space 230 with each module. When a handlebar is secured to a location corresponding to the location where it is conventionally secured, a sufficient space may not be available for disposing the entire airbag device 220. In the embodiment, by lowering the location where the handlebar is secured from P1 to P2, it is possible to provide enough space for disposing the entire airbag device 220.

In the embodiment, the recessed portion of the handlebar body 104a is large, so that the handlebar body 104a has a structure which allows the entire retainer 128 to be fitted in the recessed portion. Here, the entire retainer 128 is an engaging portion which can engage the handlebar body 104a. In addition, in the embodiment, the airbag 122 is accommodated in the retainer 128, for example, by being folded in a roll. This is an improved structure because the handlebar 104 can be effectively used for mounting the airbag device 220. The retainer 128 is disposed in an area occupied by the handlebar body 104a. Therefore, with the handlebar 104 being easily operable, it is possible to improve the appearance of an area near the handlebar 104.

Based on the above-described embodiments and various modifications thereof, the following structures may be used in the present invention.

For example, the present invention may provide a motorcycle having an airbag device mounted thereto. In the motorcycle, the airbag device is deployed and inflated in a rider protection area in which an airbag is formed in front of a rider, and an engaging portion which is engageable with part of or the entire airbag device is disposed at a handlebar section. In other words, it is possible to use a structure in which the form of the handlebar section of the motorcycle is in correspondence with the form of the airbag device, typically, the form of the retainer. Such a structure provides the same operational advantages as those of the earlier described forms of the invention.

It is possible to use a structure in which the handlebar body 104a is fabricated with the form of a recess in cross section and part of or the entire airbag device 120 or 220 is fitted to the recessed portion of the handlebar body 104a.

Although the embodiments are described with reference to the motor-bicycle 100 (scooter), the present invention may be applied to other types of motorcycles.

According to the present invention, a technology of constructing an airbag which thoroughly protects a rider on a motorcycle in an accident, and technologies related thereto are provided.

What is claimed is:

1. An airbag device for a vehicle having a handlebar, the airbag device comprising:
    an airbag for being deployed in an area generally adjacent the handlebar;
    an inflator for supplying inflation gas to the airbag; and
    a retainer for the airbag and the inflator with at least one of the airbag and the retainer being secured to the handlebar and the retainer being entirely external relative to the handlebar,
    wherein both the airbag and the retainer include mounts for being directly secured to the handlebar.

2. An airing device for a vehicle having a handlebar, the airbag device comprising:
    an airbag for being deployed in an area general adjacent the handlebar; and
    a retainer for the airbag with at least one of the airbag and the retainer being secured to the handlebar, wherein the retainer includes an engaging portion that contacts the handlebar,
    the retainer engaging portion has a predetermined configuration substantially complimentary to that of the handlebar to allow the engaging portion to be in substantially flush contact with the handlebar, and
    wherein the predetermined configuration of the handlebar engaging portion is substantially concave to match a convex curvature of the handlebar.

3. An airbag device for a vehicle having a handlebar, the airbag device comprising:
    an airbag for being deployed in an area generally adjacent the handlebar;
    a retainer for the airbag with at least one of the airbag and the retainer being secured to the handlebar, wherein the retainer includes an engaging portion that contacts the handlebar,
    the retainer engaging portion has a predetermined configuration substantially complimentary to that of the handlebar to allow the engaging portion to be in substantially flush contact with the handlebar, and
    wherein the handlebar engaging portion of the retainer comprises an arcuate recess.

4. In combination, an airbag device for a vehicle, and a handlebar of the vehicle, the combination comprising:
    an airbag for being deployed in an area generally adjacent the handlebar;
    an inflator for supplying inflation gas to the airbag;
    a retainer for the airbag and the inflator with at least one of the airbag and the retainer being secured to the handlebar and the retainer being entirely external relative to the handlebar,
    wherein the handlebar has a pair of laterally spaced and generally upwardly extending side portions, and the retainer extends between the handlebar side portions, and the retainer or the airbag include portions that extend laterally beyond the handlebar side portions.

5. An airbag device for a vehicle, the airbag device comprising:
    a handlebar;
    an airbag for being deployed in an area generally adjacent the handlebar; and
    a retainer for the airbag with at least one of the airbag and the retainer being secured to the handlebar;
    wherein the handlebar has a pair of laterally spaced and generally upwardly extending side portions, and the retainer extends between the handlebar side portions, and the handlebar includes end portions extending laterally outward from upper ends of the handlebar side portions with the retainer secured to the side portions and the airbag secured to the end portions.

6. The airbag device of claim 5 wherein the retainer includes a cover spanning the handlebar side portions and extending over at least portions of the handlebar end portions.

7. The airbag device of claim 2 wherein the retainer and the airbag are disposed entirely between handlebar side portions.

8. A restraint system for a vehicle, the restraint system comprising:
    a handlebar; and
    an airbag assembly including an airbag and a retainer therefor with the airbag assembly being mounted to the handlebar, wherein the handlebar has a generally arcuate outer surface, and the airbag retainer has a generally arcuate recess that is in close fitting engagement with the handlebar outer surface.

9. The restraint system of claim 8 wherein the handlebar has laterally spaced side portions, and the airbag retainer extends between the handlebar side portions.

10. A restraint system for a vehicle, the restraint system comprising:
    a handlebar having a substantially hollow, tubular configuration; and
    an airbag assembly including an airbag, an inflator and a retainer therefor with the airbag assembly being externally mounted to the hollow handlebar so that the airbag assembly is entirely outside the hollow handlebar,
    wherein both the airbag and the retainer are independently secured to the handlebar.

11. A restraint system for a vehicle, the restraint system comprising:
    a handlebar; and
    an airbag assembly including an airbag and a retainer therefor with the airbag assembly being mounted to the handlebar;
    wherein both the airbag and the retainer are secured to the handlebar, and the handlebar includes laterally spaced side portions that extend upwardly and include respective end portions that extend laterally outward therefrom with the retainer secured to the side portions and the airbag including accordion fold portions secured to the end portions.

12. The restraint system of claim 8 wherein only the retainer is secured to the handlebar.

13. The restraint system of claim 12 wherein the airbag has a roll-folded configuration in the retainer.

14. The restraint system of claim 8 including a motorcycle with the handlebar being for steering the motorcycle.

* * * * *

UNITED STATES PATENT AND TRADEMARK OFFICE
CERTIFICATE OF CORRECTION

| | |
|---|---|
| PATENT NO. | : 7,198,287 B2 |
| APPLICATION NO. | : 10/800263 |
| DATED | : April 3, 2007 |
| INVENTOR(S) | : Yasuhito Miyata |

It is certified that error appears in the above-identified patent and that said Letters Patent is hereby corrected as shown below:

Column 7, line 26, change "airing" to -- airbag -- and

Column 7, line 28, change "general" to -- generally --

Signed and Sealed this

Twelfth Day of June, 2007

JON W. DUDAS
*Director of the United States Patent and Trademark Office*